Nov. 11, 1924.
H. BARKMANN ET AL
1,515,328
TRUCK
Filed Jan. 2, 1923 3 Sheets-Sheet 3
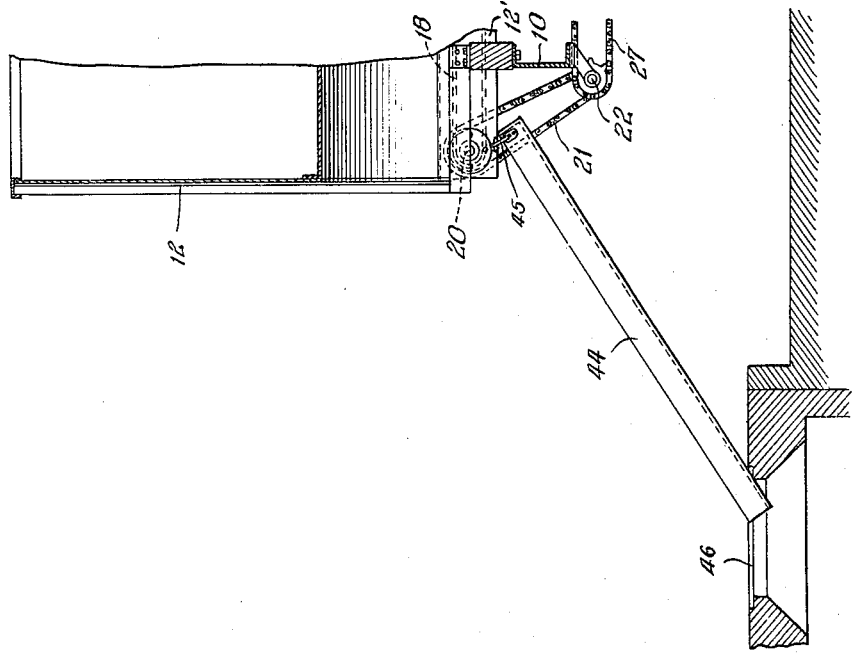
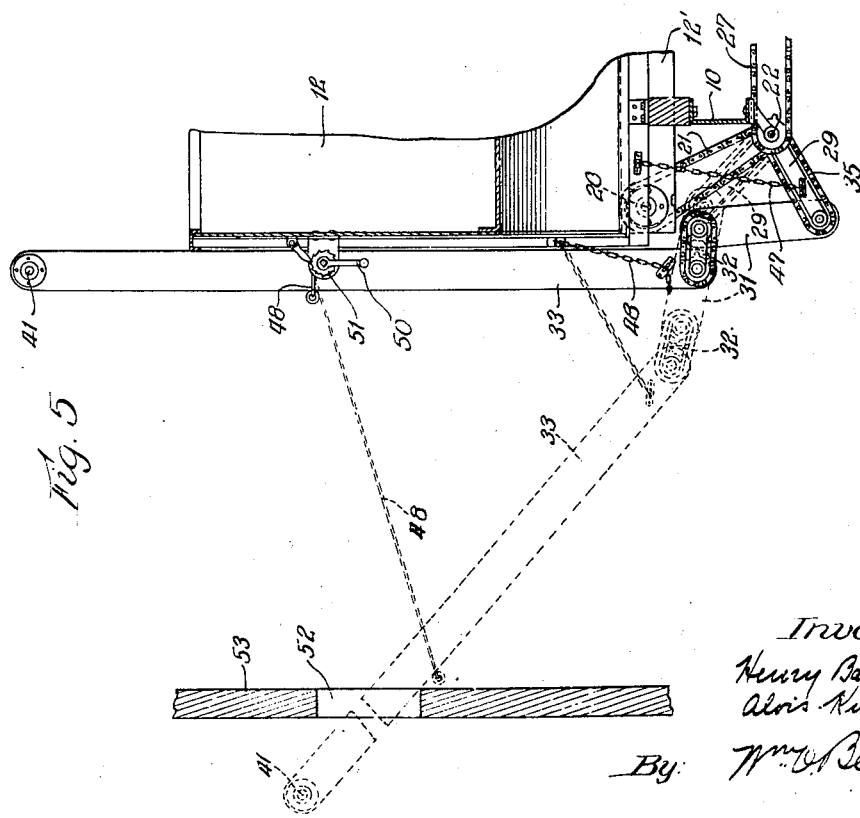

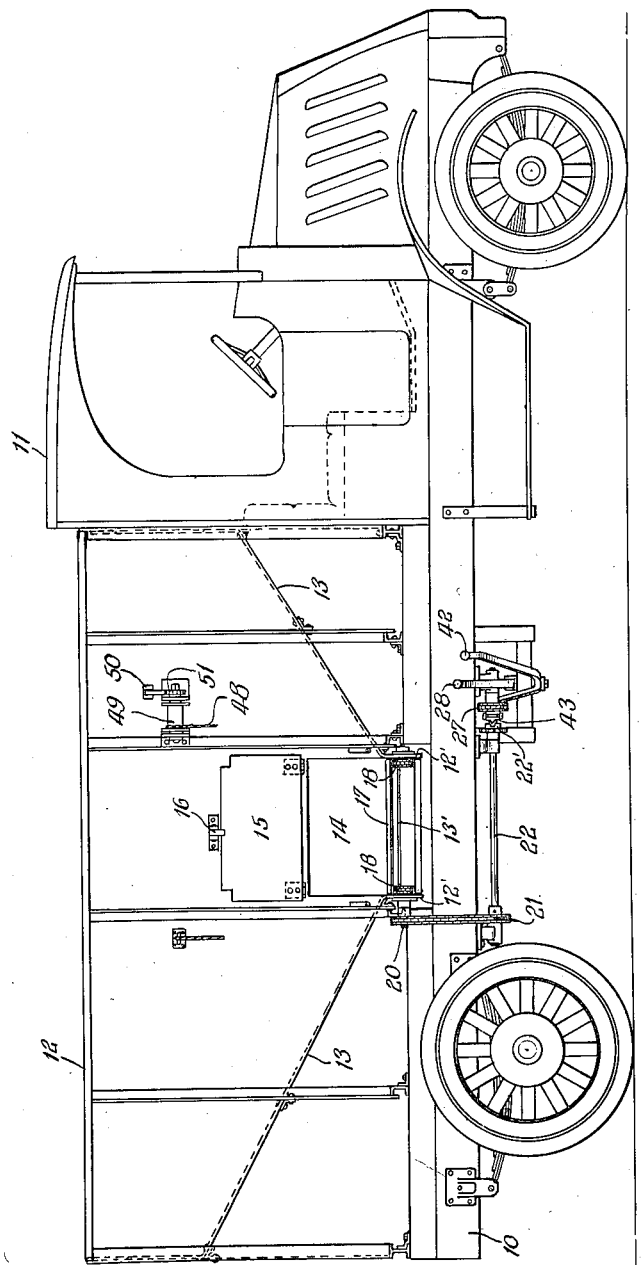

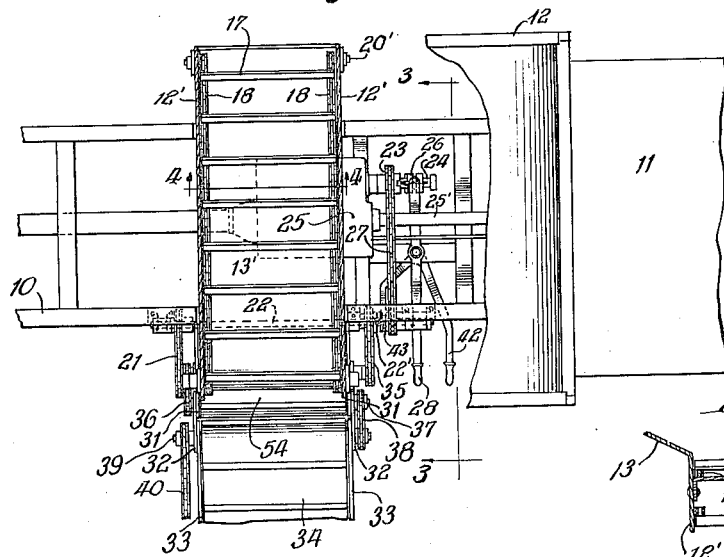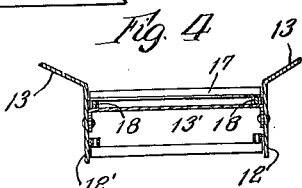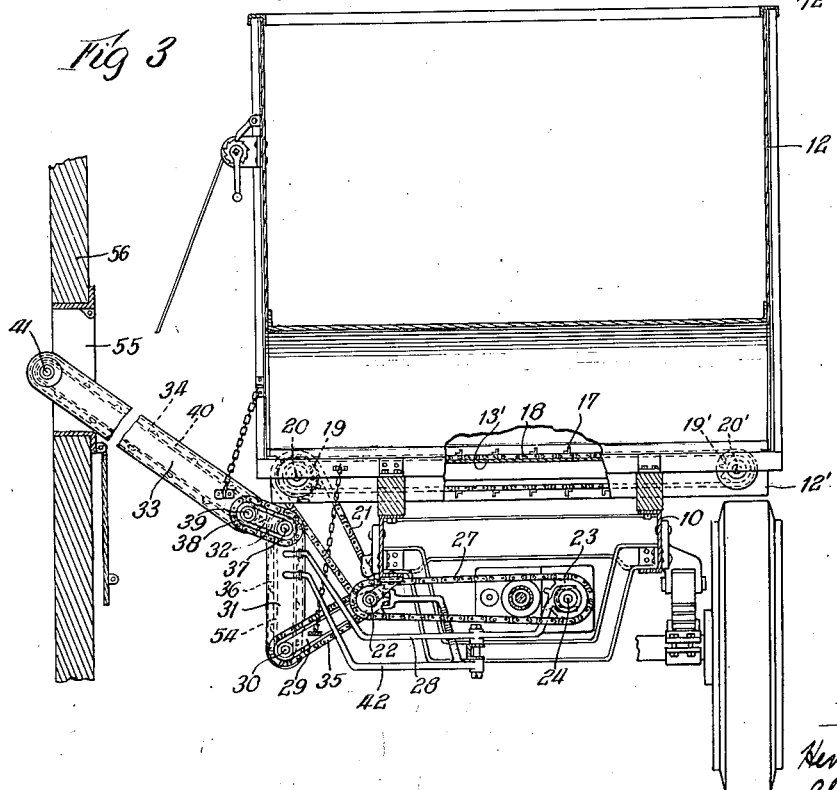

Patented Nov. 11, 1924.

1,515,328

UNITED STATES PATENT OFFICE.

HENRY BARKMANN AND ALOIS KUTSCHA, OF CHICAGO, ILLINOIS.

TRUCK.

Application filed January 2, 1923. Serial No. 610,271.

*To all whom it may concern:*

Be it known that we, HENRY BARKMANN and ALOIS KUTSCHA, citizens of the United States, residing at Chicago, in the county of Cook and State of Illinois, have invented certain new and useful Improvements in Trucks, of which the following is a specification.

This invention relates to improvements in trucks for mechanically discharging and delivering a load of bulk material from the body of the truck without tilting or raising the body, and it comprises certain improvements upon the invention covered by our Patent No. 1,436,428, patented November 21, 1922.

The object of the invention is to simplify and improve the means for discharging and delivering the load from the truck completely and expeditiously, without requiring any manual labor except for the proper distribution of the conveyers.

A further object of the invention is to provide means within the body of the truck for receiving and carrying the load to the discharge outlet at the side of the truck and thereby avoid the necessity for manually moving any part of the load to the discharge outlet.

A further object of the invention is to provide means whereby the delivery may be easily lengthened to better adapt it for delivering the load.

The invention has other objects in view which will appear hereinafter in the detail description of the selected embodiment of the invention illustrated in the accompanying drawings, in which—

Fig. 1 is a side elevation of a motor truck having a body for bulk material and embodying our invention.

Fig. 2 is a top plan view of a portion of a truck, parts being broken away, showing the drag conveyer and the control levers and some other parts.

Fig. 3 is a transverse sectional view on the line 3—3 of Fig. 2.

Fig. 4 is a transverse sectional view on the line 4—4 of Fig. 2 showing parts of the truck body bottom.

Fig. 5 is a sectional view showing the delivery conveyer in folded position in full lines and in delivering position in broken lines.

Fig. 6 shows a modified construction for delivering the load to a manhole.

Referring to the drawings, 10 indicates the chassis of a motor truck having a cab 11 and a body 12 supported thereon, the body being adapted to contain bulk material such as coal, crushed stone and the like, and having sides extending longitudinally of the truck and a bottom 13 which inclines downwardly from the front and from the rear to a horizontal transverse central section 13', located in alignment with a discharge outlet 14 in one of the longitudinal sides. This opening is normally closed by a hinged door 15, which is secured in open position by suitable latch device 16. A drag conveyer 17 is arranged transversely of the body to travel over the section 13' of the bottom to carry the material in the body of the truck to the discharge outlet 14 and deliver it from the body. The drag conveyer is operated by link chains 18 which travel over sprockets 19, 19' on the shafts 20, 20', journaled in the body frame 12', the latter shaft being driven by a chain 21 driven from a main shaft 22, which is supported beneath the chassis. A driving sprocket 23 is loosely mounted upon a power shaft 24 forming part of the transmission 25, driven by shaft 25' from the truck engine (not shown) and normally rotating when the engine is running. A clutch 26 of any suitable construction is provided for connecting the driving sprocket 23 with shaft 24 to drive the chain 27, which in turn drives the shaft 22. A handle lever 28 is supported on the chassis for throwing the clutch into and out of operation. A frame 29 is pivotally mounted on the shaft 22 and it carries a shaft 30 to which a frame 31 is pivoted. The latter frame is connected by links 32 with the frame 33 of a delivery conveyer 34. A chain 35, driven by shaft 22, drives the shaft 30, and a chain 36, driven by shaft 30, drives shaft 37, and a chain 38, driven by shaft 37, drives shaft 39, and a chain 40, driven by shaft 39, travels over and drives shaft 41, located at the outer end of the delivery conveyer frame 33 and over which the delivery conveyer 34 travels.

Thus the drag conveyer and the delivery conveyer are both driven from the same shaft 22, which is in turn driven from the transmission shaft 24. When the lever 28 throws in the clutch 26, the chain 21 and shaft 20 will be operated to operate the drag conveyer. A handle lever 42 is pivotally mounted beneath the chassis to operate a clutch 43 of any suitable description for engaging a sprocket wheel 22' with said shaft 22 for driving the chain 35, and through this chain and its connections the delivery conveyer 34 is operated. This is an important feature of our invention because the delivery conveyer and its associated parts may be removed from shaft 22 to permit the use of a trough 44 (Fig. 6) which can be suspended by hooks 45 or other suitable means from the chassis to receive the material discharged from the body by the drag conveyer to convey said material to a manhole 46 in the sidewalk, or to some other desired place. Chains 47 and 48 are preferably connected to the frames 29 and 33 to suspend them from the chassis and the body frame, and a rope 48 is preferably connected to the delivery conveyer frame 33 and to a drum 49 mounted on the body and provided with a handle 50 and a ratchet device 51 for raising and lowering the delivery conveyer to a proper delivery height. By reason of the articulation of the frames 29, 31, 32 and 33, we are enabled to adjust the delivery conveyer in many desired positions, for example, to discharge through an opening 52 in a wall 53 (Fig. 5) a supplemental conveyer 54 is carried by the frame 31 and is driven by the shaft 30 and this conveyer constitutes, in effect, an extension of the main delivery conveyer 34 so that by swinging the parts from the position shown in Fig. 3 to the broken line position shown in Fig. 5, the delivery conveyer may be extended to project for a distance through the opening 52, instead of simply discharging through the opening 55 in wall 56.

Our invention provides a simple and convenient means for discharging and delivering a load of material from a truck to a vault, a manhole, or to any other desired place, and it can be manufactured, installed and operated at comparatively low cost. It not only greatly facilitates and expedites the unloading operation, but it enables it to be conducted without loss of material and in a cleanly manner. The invention is particularly adapted for unloading coal from motor trucks which, at the present time, often have a capacity of many tons. It is generally necessary to deliver the coal supply for large office buildings, stores and hotels in business districts daily, and often the coal must be delivered in a side wall, off of a narrow alley, in another place in a manhole in the sidewalk and in other places it must be conveyed over an intervening space. Our invention is designed to enable the delivery of coal or other material under all the usual conditions which ordinarily prevail and by manipulating the frames 29, 31, 32 and 33 in or about the manner indicated in Figs. 3 to 5, or otherwise, a provision may be made for delivering the material to many different positions; or the trough 44 of Fig. 6 may be employed, if desired, for delivering the material to a manhole.

We find it especially desirable to use the drag conveyer for moving the material out of the truck body, for otherwise it is generally necessary to put a man in the truck body or hopper to push or shovel the coal to or through the outlet. This becomes unnecessary with the drag conveyer, except as it may be occasionally required if the material fails at any time to slide freely down the inclined bottoms 13—13, and when the material sticks or fails to move, it will generally be sufficient to hammer the sides or the bottom of the truck body to start it moving. We believe that this will not be necessary except under most unusual conditions because our experience is that with the arrangement shown and described the material will move freely down the bottoms 13 upon the drag conveyer, and then the drag conveyer will discharge it through the outlet 14 upon the main delivery conveyer 34 when the latter is in the position shown in Fig. 3 or upon the extension conveyer 54 in the arrangement shown in broken lines in Fig. 5, and in this arrangement the material will be received from the discharge outlet of the truck body upon the extension conveyer and be delivered by it on to the main delivery conveyer 34, as will be readily understood.

We have not thought it necessary to detail the construction of the conveyers or the means for driving them any more than is herein shown and described, because these means as well as other parts of the apparatus may be changed in their form, construction and arrangement to suit different trucks, and to meet different conditions, within the scope of the following claims.

We claim:

1. A truck body comprising a bottom and longitudinal sides, one of said sides having a single discharge opening therein, said bottom having a portion in alinement with said opening, a drag conveyer traveling thereover and arranged transversely of the body to convey material therein to said opening and the entire remainder of said bottom extending downwardly to said first-named portion to direct all the material in said body to said conveyor.

2. A truck body comprising a bottom, front and rear ends, and longitudinal sides, one of said sides having a single discharge opening therein, the entire bottom being divided into three portions, one of which is in alinement with said opening and the other two of which are inclined downwardly from said front and rear ends to said first-named portions, and a drag conveyor travelling over said first named portion whereby all the material in said body is directed to said conveyor and carried by said conveyor to said opening.

3. In a truck, a body having a discharge outlet, a delivery conveyer for directly receiving the material discharged through said outlet, a pivotally mounted supplemental conveyer permanently disposed intermediate said delivery conveyor and the chassis and adapted to be swung into position to form an extension at the rear end of said delivery conveyer, and means for operating said conveyers.

4. In a truck, a body having a discharge outlet, a delivery conveyer for receiving material discharged through said outlet, means for bringing said delivery conveyor into a plurality of adjusted positions with respect to said outlet, a supplemental conveyer pivotally connected to the inner end of said delivery conveyer and adapted to form an extension thereof, and means for operating said conveyers.

5. In a truck, a body having a discharge outlet, a delivery conveyer for receiving material discharged through said outlet, a supplemental conveyer normally supported in substantially upright position beneath the body and adapted to be shifted from said upright position to form an extension of said delivery conveyer, and means for operating said conveyers.

6. In a truck, a body having a discharge outlet, a delivery conveyer adapted to receive material discharged through said outlet, a frame for said delivery conveyer, means including a cable operatively connected to said delivery conveyor for bringing said delivery conveyor into a plurality of adjusted positions with respect to said outlet, a supplemental conveyer adapted to form an extension of said delivery conveyer, a frame for said supplemental conveyer, means pivotally connecting the delivery conveyer frame and the supplemental conveyer frame, and means for operating said conveyers.

7. In a truck, a body having a discharge outlet, a delivery conveyer for receiving material discharged through said outlet, means including a cable operatively connected to said delivery conveyor for bringing said delivery conveyor into a plurality of adjusted positions with respect to said outlet, a supplemental conveyer adapted to form an extension of said delivery conveyer, a frame for said supplemental conveyer, means for pivotally supporting said frame beneath the body, and means for operating said conveyers.

8. In a truck, a body having a discharge outlet, a delivery conveyer for receiving material discharged through said outlet, a frame for said delivery conveyer, a main shaft, a supplemental conveyer adapted to form an extension for said delivery conveyer, a frame for said supplemental conveyer, and means pivotally connecting the supplemental conveyer frame to the delivery conveyer frame and to the main shaft.

9. In a truck, a body having a bottom and having a discharge outlet adjacent said bottom, a drag conveyer forming a portion of at the bottom of said body for conveying the material of the load within the body to said outlet, a delivery conveyer supported on the truck and adapted to receive the material discharged by the drag conveyer through said outlet, and means for operating said conveyers.

10. In a truck, a body having a discharge outlet, a drag conveyer arranged at the bottom of said body for conveying the material of the load within the body to said outlet, a delivery conveyer for receiving the material discharged through said outlet, a supplemental conveyer adapted to form an extension of said delivery conveyer, and means for operating said conveyers.

11. In a truck, a body having a discharge outlet, a drag conveyer arranged at the bottom of said body for conveying the material of the load within the body to said outlet, a delivery conveyer adapted to receive the material discharged through said outlet, a frame for said delivery conveyer, a supplemental conveyer adapted to form an extension for said delivery conveyer, a frame for said supplemental conveyer, a support, means for pivotally connecting the supplemental conveyer frame to the delivery conveyer frame and to said support, and means for operating said conveyers.

12. In a truck, a body having a discharge outlet, a drag conveyer arranged at the bottom of said body for conveying the material of the load within the body to said outlet, a delivery conveyer for receiving the material discharged through said outlet, and means for operating said drag conveyer with or independently of said delivery conveyer.

13. In a truck, a body having a discharge outlet, a drag conveyer arranged at the bottom of said body for conveying the material of the load within the body to said outlet, a delivery conveyer for receiving the material discharged through said outlet, a supplemental conveyer adapted to form an extension of said delivery conveyer, a power shaft, a main shaft operated by said power shaft, and means operated by said main shaft for operating said conveyers.

14. In a truck, a body having a discharge outlet, a pivotally mounted delivery conveyor for receiving the material discharged from said outlet, a pivotally mounted supplemental conveyor adapted to form an extension at the rear end of said delivery conveyor, means for securing said delivery conveyor and said supplemental conveyor in a plurality of adjusted positions relative to said outlet, and means for operating said conveyors.

HENRY BARKMANN.
ALOIS KUTSCHA.